United States Patent [19]
Simonsen et al.

[11] 3,858,146
[45] Dec. 31, 1974

[54] ELECTRICAL DISCHARGE RESISTOR

[76] Inventors: Bent Pors Simonsen; Hans Imhoff, both of 2700 Peterson Way, 47 B, both of Costa Mesa, Calif. 92626

[22] Filed: June 4, 1973

[21] Appl. No.: 367,011

[52] U.S. Cl. .................................. 338/55, 29/610
[51] Int. Cl. ............................................ H01c 1/08
[58] Field of Search ..................................... 338/55; 29/610-611; 323/98; 219/304, 306, 307

[56] References Cited
UNITED STATES PATENTS

| | | | |
|---|---|---|---|
| 2,117,419 | 5/1938 | Hamrick et al. | 219/306 |
| 2,370,399 | 2/1945 | Goodale | 338/55 X |
| 2,596,327 | 5/1952 | Cox et al. | 338/55 X |
| 2,677,743 | 5/1954 | Canegallo | 338/55 |
| 3,099,737 | 7/1963 | Naxon | 338/55 X |
| 3,283,123 | 11/1966 | Atkinson et al. | 219/307 |

Primary Examiner—C. L. Albritton
Attorney, Agent, or Firm—Michael H. Laird, Esq.

[57] ABSTRACT

A light weight portable power resistor suitable for dissipating electrical power from an electrical power supply during testing or adjustment and dissipating the heat thus generated by direct heat exchange to water supplied by a municipal water supply comprises a flexible metallic conductive ribbon axially disposed within and along the length of a flexible non-conductive fluid conduit dividing the conduit into a plurality of axial fluid passageways coiled through at least 360°, water inlets and outlets at either end of the conduit for passing the water through the axial passages and over all surfaces of the conductive strip, and electric terminals entering the conduit and in contact with either end of the conductive strip for supplying power from the source to the conductive strip.

8 Claims, 3 Drawing Figures

ELECTRICAL DISCHARGE RESISTOR

It is often desirable, and in many instances essential, to operate electrical power supplies on artificial resistive loads, often termed power or breaking resistors, when the normal operating load on the power supply is isolated from the system either intentionally or accidentally. This procedure is often followed intentionally in the course of testing or adjusting AC or DC power supplies or their mechanical driving mechanisms, or demonstrating the utility and performance characteristics of a power supply during customer inspection. In any event, it is not advisable to vary the performance of such power sources during actual use in supplying power to a normal operating load.

This is true in many cases. For example, various commercial systems are extremely sensitive to or cannot be operated at all with a transient power source. Notable among these, and probably the most sensitive to the power supply variations, are computer systems which are finding every broader commercial application. The majority of these systems are so sensitive to power transients that extreme precautions must be observed even during normal steady state operation to avoid a variety of computer malfunctions. Obviously the power supplies to installations of this nature cannot be adjusted or varied in the manner necessary for a complete investigation while actively engaged in supplying power to a transient-sensitive load.

These problems have been recognized for some time and have been avoided by adjusting the supply system only while it is isolated from the normal operating load. An artifical load is substituted for the normal operating load in the form of a discharge resistor. However, the discharge resistors presently available for accomplishing this purpose suffer from numerous disadvantages. Notable among these are relatively high cost, high weight, manufacturing complexity, relatively large size and excessive heat.

The majority of the cost of these artificial loads is often a result of the complexities involved in their manufacturer and the size of the resistor and attendant heat exchange surface required to dissipate the considerable power developed by many commercial power supplies — loads that often exceed 10 or even 100 KW.

The presently available power resistors capable of dissipating loads of this magnitude, aside from being relatively expensive, are so large and heavy that it is often impossible, or at least highly impractical, to locate them within a reasonable distance of the equipment to be tested. For example, power supplies for computer installations are often installed in the upper floors of office buildings or within the interior thereof requiring access through elevators, stairwells, or a multiplicity of doors through which heavy bulky load banks cannot be conveyed. As a consequence, it is sometimes necessary to locate the artificial load outside of the installation and inter-connect the load and power supply with lengthy, heavy cables. This expedient is obviously not only cumbersome and inconvenient but can also involve considerable expense when considering the cost of transmitting cables and the labor involved in their installation.

Many of the currently available artificial loads are of the air-cooled variety that necessarily give off considerable heat to the immediate environment. This, in turn, requires accessory cooling of the location and in some cases, extreme loads on air conditioning systems.

Similar costs and inconvenience are associated with the use of presently available breaking resistors which are temporarily connected to electric power circuits that have been rendered into an abnormally light load state when the load is isolated from the power supply due to a fault in either the power supply itself or in the normal operating load. For example, many operating loads operate on a plurality of power supplies one or more of which may be automatically isolated from the load upon the occurrence of a fault in either the load or the power supply. However, it is sometimes desirable or even essential to avoid the necessity of maintaining the operation of the power supply even though it is temporarily disconnected from the operating load. Accordingly, the isolated supply must be automatically switched to an artificial load so that its operation may be maintained until the malfunction is discovered and-/or the power supply can be reintroduced into the normal operating load.

The discharge resistors or artificial loads to which this invention is directed find application in these and other situations and afford the advantage of being inexpensive, relatively light weight and portable. They are conveniently operable on readily available heat dissipating sources such as conventional municipal water systems and thus minimize cost and unwanted heating of the immediate environment.

Accordingly, it is one object of this invention to provide an improved breaking or power resistor. It is another object to provide an inexpensive, light weight power resistor which is readily portable to the site of the power supply system to be tested. Another object involves the provision of a portable light weight artificial electrical load which employs a conventional municipal water supply as its sole source of heat dissipation. Another object involves an improved method for manufacturing the described artificial electrical loads and methods of dissipating the power from electrical power supplies employing these loads.

Other objects and advantages of this invention will be apparent from the following disclosure, the drawings and the appended claims.

Figure 1:
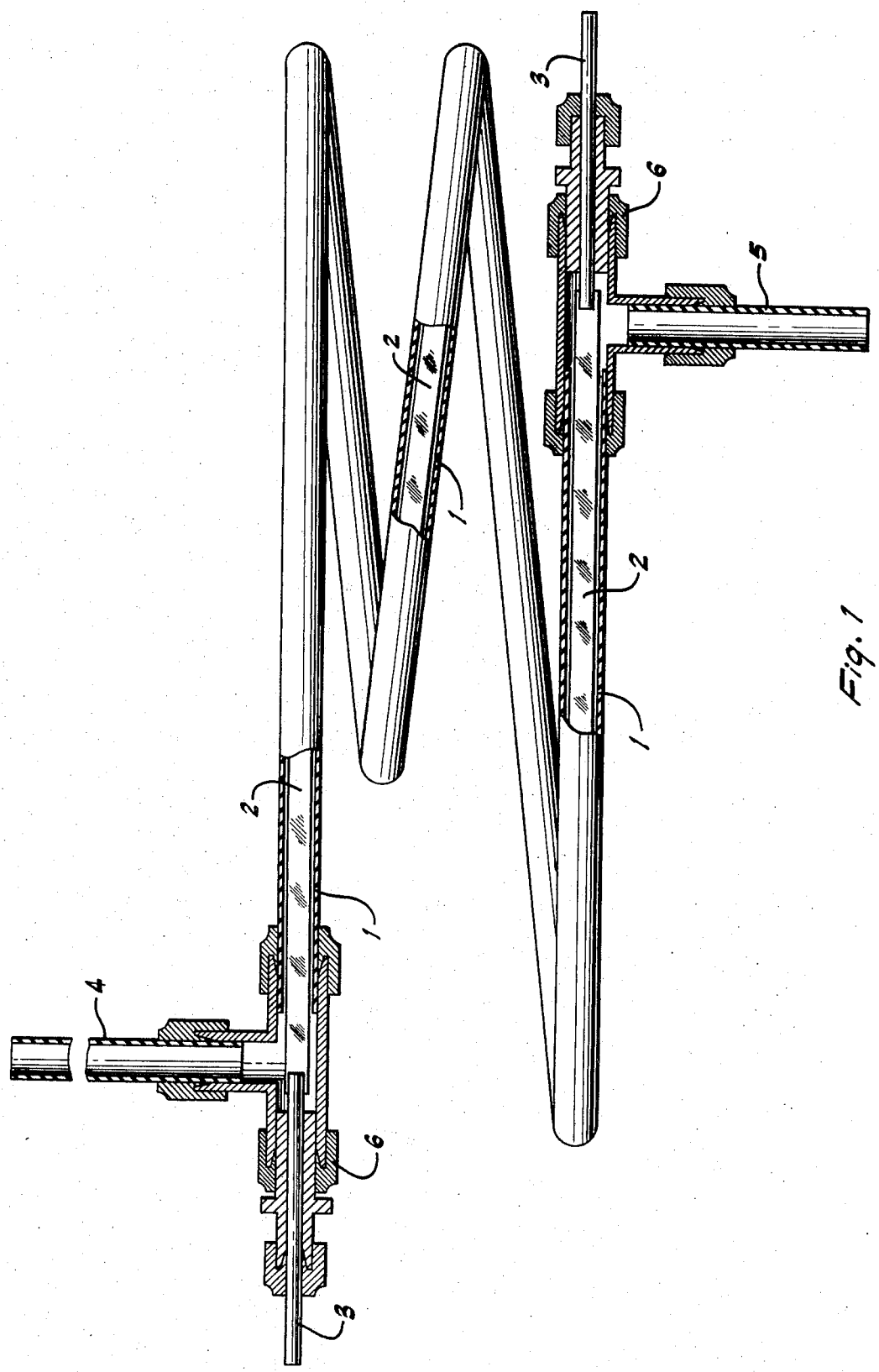
FIG. 1 is a side view of a coiled breaking resistor in accordance with this invention illustrating the water inlets and outlets and flexible resistive ribbon disposed within the fluid conduit.

Referring now to the drawings, FIG. 1, illustrating one embodiment of this invention employing a single resistive element, includes conductive strip 2 contained within flexible conduit 1 and terminating at either end of the conduit at electrical terminal 3 to which conductive strip 2 is conductively connected. Fluid conduit 1 is further provided with fluid inlet 4 and outlet 5 for passing cooling fluid, e.g. water, through the axial passage-ways prescribed by conductive ribbon 2 and the inside surfaces of the fluid conduit in order to remove heat generated in the conductor by direct heat exchange with all of its surfaces. In the preferred embodiment, water inlet 4 is a water conduit connected to a conventional municipal water outlet such as the faucets found in all commercial and private structures. The several components are retained in their relative positions by tubing fittings 6 or other equivalent means for binding the fluid conduit, conductive strip and electrical terminals in their desired relationship.

Figure 2:
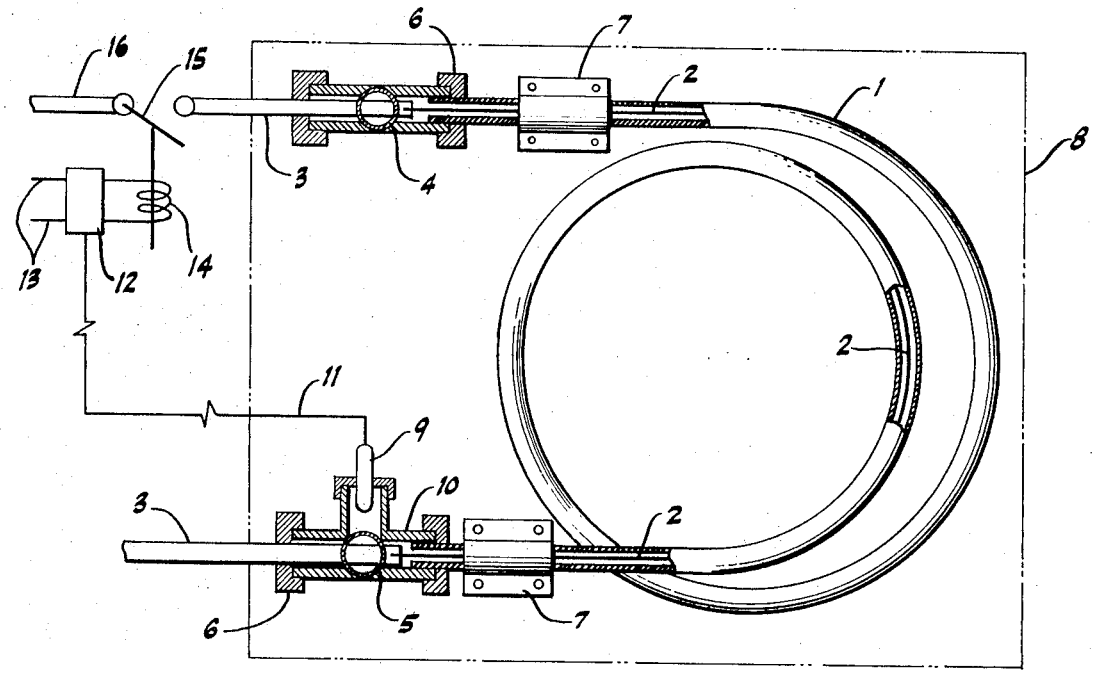
FIG. 2 is a top planar view of a similar coiled breaking resistor in combination with a thermostatic control in the electrical power supply rigidly mounted to a stationary or portable framework.

FIG. 2 is a top view of the apparatus illustrated in the FIG. 1 fixidly attached to a rigid housing or backing 8 which can be either a platform or a carrying case the size of a normal suitcase. In this illustration the tubing and conductive ribbon are fixidly attached to rigid support 8 by flanges 7 bolted to the support surface. Obviously many other means of securing the artificial load to either a stationary or portable framework can be employed. However, in the presently preferred embodiment it is desirable to insure that the major portion of conduit 1 and conductive element 2 are freely suspended so that they may flex-expand or contract in unison-under the influence of transient pressure variations in the water supply system.

The apparatus illustrated in FIG. 2 is also provided with temperature sensing means 9 such as a thermocouple, fluid-filled temperature sensing bulb or other similar apparatus for sensing the temperature in casing 10 housing water outlet 5 and controlling the supply of electrical power to the conductive element 2 in response to that temperature. Temperature indicator 9 develops a signal indicative of the water temperature leaving conduit 1 and transmits that signal via line 11 to controller 12. Controller 12 is a conventional temperature controller operated on any suitable electrical power source supplied by leads 13 and operating solenoid 14 and switch 15. Switch 15, when disconnected, serves to isolate terminal 3 and accordingly, conductive element 2, from the power supply thereby preventing damage to the artificial load due to either excessive power or insufficient cooling. Both of these occurrences will be reflected by excessively high water temperatures in housing 10. These temperatures should not exceed a predetermined maximum, e.g. 90°C., so as to assure the absence of localized hot spots, boiling or other formation of water vapor within conduit 1 or along conductor 2. Thus, when the temperature of the cooling fluid exiting the system via fluid outlet 5 exceeds a predetermined maximum, the signal relayed by temperature detector 9 to controller 12 will open solenoid 14 and switch 15 thereby discontinuing supply of power to the system.

Figure 3:
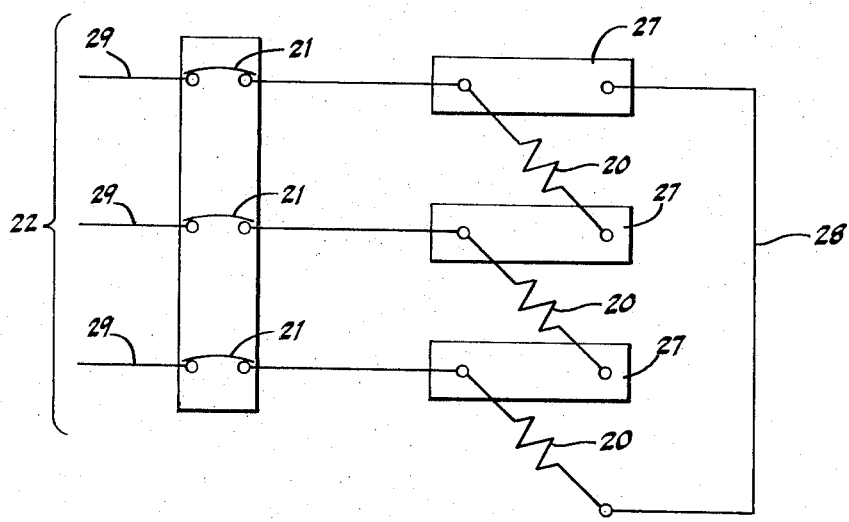
FIG. 3 is a schematic illustration of the manner in which the artificial load or breaking resistors of this invention can be combined in "delta" configuration for dissipating three phase power.

FIG. 3 illustrates the use of three artificial loads 20 employed in a "delta" configuration to dissipate power from a three-phase power supply 22. The three-phase electrical current is supplied to the resistive loads through leads 29 and circuit breakers 21. The loads in turn are connected in "delta" configuration via conductors 27 and 28. Circuit breakers or switches 21 can be opened in response to the signal from a temperature indicator such as indicator 9 illustrated in FIG. 2 when the temperature of the cooling fluid leaving the system indicates that the heat dissapating ability of the system is being exceeded.

The fluid conduit should be nonconductive and flexible and can be composed of any material which meets these specifications such as nylon, polyethylene, polypropylene, numerous synthetic elastomers and the like. It must be nonconductive in order to prevent conductance of any significant amount of electrical current through the conduit which in turn would reduce the path that current must flow through the water phase between the conductive strip and any other conductor.

As pointed out above, one of the advantages of this apparatus is that it affords the ability to dissipate a considerable amount of electrical power with a small light weight breaking resistor. However, in order to accomplish this function, it is essential that the components themselves be relatively light weight and that particularly the resistor be flexible and of relatively small dimensions. Accordingly, the fluid conduit will have a relatively small inside diameter, e.g. less than 2 inches, with the result that current could readily flow between the conductive strip and fluid conduit were the conduit fabricated from electrically conductive material. In contrast, the use of a non-conductive conduit forces any current flow through the cooling water phase to pass through the complete length of the fluid conduit, e.g. at least about 10 feet and usually more than 15 feet. We have found that the conductivity of water from conventional municipal water supplies is sufficiently low so that the amount of current passing through this length of water is so nominal as to be insignificant.

The second requirement of the fluid conduit, that it be easily flexible, is essential to maintaining the desired position of the conductive strip within the conduit. As already mentioned, in order to handle high power loadings, e.g. in excess of 10 kw, with a relatively small light weight apparatus such as herein described, it is essential that the conductive strip itself be a relatively small dimensions. Moreover, the preferred method of manufacturing hereinafter detailed further requires that the conductive strip be readily flexible so that it can be coiled into a much smaller package than would be otherwise required by an uncoiled conductor.

This combination of factors renders the apparatus particularly susceptible to breakage of deformation, i.e., deflection of the conductive strip within the conduit particularly when fully loaded with water. Any significant deflection of the conductor within the conduit would restrict or block the axial passages essential for proper cooling. This is particularly true in the portable embodiment where the apparatus may be dropped or otherwise subjected to abrupt shocks during use.

In addition, the use of a municipal water supply, although very convenient, requires that the apparatus be able to handle significant fluctuations in water pressure without damage or deformation of the conductive strip within the fluid conduit as above described. Accordingly, it is essential that some shock absorbing capability due to both droppage or significant water pressure variation be built into the apparatus. These considerations require the use of both the flexible conduit and flexible conductor so that both of these elements can flex in unison thereby absorbing any shock induced by variations in water pressure or mishandling. These two criteria, the use of a flexible conduit and conductor, are also essential to the preferred manufacturing method hereinafter described.

In the preferred apparatus, the fluid conduit is preferably at substantially constant interior dimensions along its entire length occupied by the conductive strip so that the conductor, as hereinafter described, upon being positioned axially within the fluid conduit, will divide the conduit into a plurality of fluid passage-ways defined by the surfaces of the conductor and the inside walls of the conduit. Furthermore, in the preferred embodiment, the fluid conduit, having the flexible laminar elongate conductive strip axially disposed within the conduit, is preferably coiled, e.g. bent, through at least about 360° along the length occupied by the conductor, preferably in a plane perpendicular to the surfaces, e.g. the width, of the conductive strip. In this form the apparatus provides another major advantage in that it occupies very little space yet provides a relatively long conductive pathway through both the conductive strip and cooling water phase.

The conductor is a flexible laminar elongate strip, preferably a planar conductive metal ribbon, e.g. stainless steel, axially disposed within the fluid conduit. It is preferable that this strip exhibit substantially constant conductivity along its entire length in order to avoid discontinuities in heating rates. Thus, it is preferred that the conductor be of substantially constant dimensions along its entire length, e.g. constant cross-sectional and surface area so as to assure both constant resistivity and heat exchange at all points. Variations of this design are obviously possible such as the provision of integral spacers in the conductor to space it from the interior walls of the conduit.

It is also preferred that the conductor have an elongate cross-section, and preferably a rectangular cross-section, corresponding to a width to thickness ratio of at least about 10 and preferably at least 15, and a surface to volume ratio of at least about 2, preferably at least about 5. The width of the conductor commonly corresponds to at least about 80 percent and preferably at least about 90 percent of the inside diameter of the fluid conduit so that when positioned in the conduit the conductor will substantially divide the conduit into a plurality of axial passage-ways prescribed by the major surfaces of the conductor and the inner surfaces of the conduit. By this design, substantially equivalent rates of water flow along all major surfaces of the conductor are assured with the result that localized hot spots, over-heating and conductor burn-out will be prevented.

The utility and advantages of this apparatus are illustrated by the fact that a system involving three resistors, each consisting of 25 foot lengths of No. 302 stainless steel ribbon 0.285 inches in width and 0.015 inches thick contained in flexible nylon tubing having an inside diameter of 0.295 inches, coiled into a container of approximately 2½ feet in length, 1½ foot deep and 2 feet high can effectively dissipate 100 kw when using water supplied by a municipal water supply at a rate of 5 gallons per minute. Under these conditions, water introduced into the cooling conduit at a temperature of 20° C will increase to approximately 90° C before exiting the system.

Due to the relative dimensions and flexibility of both the conductive strip and fluid conduit, this apparatus can be easily manufactured from readily available materials without the use of any sophisticated tooling, casting, extruding or the like. In accordance with the preferred method of manufacture a suitable lead such as a wire having a clamp affixed to one end is passed through the fluid conduit so that the end having the fastener attached thereto is passed out of the other end of the tubing. The clamp or equivalent means of attachment is then attached to one end of the conductive flexible strip and drawn back through the tubing. The tubing is preferably held in a substantially straight alignment in order to avoid flexure or bending of a strip during insertion into the tube. The tubing and conductor are then coiled through at least 360°, preferably in a plane at least substantially perpendicular to the major surfaces of the conductive strip, into a form sufficiently small to fit into the desired space.

The resulting coil can then be affixed to a rigid backing or container as desired. The electric terminals, water inlets and outlets can be attached to the tubing either before or after insertion of the conductor although attachment of these features after positioning of the conductor is presently preferred.

As illustrated in part by the example described above, the apparatus of this invention can be employed to dissipate power from a power supply by first coupling the water inlet of the cooling fluid conduit to a municipal water supply and passing water from the supply through the conduit and thus through the axial passageways prescribed by the conductor and the inner walls of the conduit. The flow of water through the conduit should be sufficient to force all air bubbles out of the conduit and particularly off the surface of the conductor. Moreover, it should be sufficient to dissipate the heat generated by the conductor by the load subsequently applied without increasing the cooling water temperature sufficiently to form any water vapor within the vicinity of and particularly on the conductor surface. The electric terminals are then coupled to the power terminals of the power supply after which power can be passed through the discharge resistor as desired.

We claim:

1. A light weight compact portable power resistor useful for applying a resistive load to power supply equipment during intentional or accidental loss of the normal operating load on said power supply including a flexible laminer elongate conductive strip having at least two major surfaces axially disposed within a flexible non-conductive fluid conduit dividing said conduit into a plurality of parallel axial fluid passageways defined by the surfaces of said conductive strip and the interior walls of said conduit and terminating at both ends within said conduit at electric terminals extending into said conduit and electrically conductively connected with the two ends of said conductive strip, said terminals having a conductivity per unit length at least ten times that of said conductive strip, said conductive strip being of substantially constant dimensions along its length and having a width to thickness ratio of at least about 10 and a width at least about 80 percent of the maximum inside diameter of said fluid conduit, said fluid conduit having a coolant inlet and outlet at either end thereof in fluid communication with said axial passageways for passing cooling fluid into and out of said conduit along said axial passageways and along all surfaces of said conductive strip, said fluid conduit and conductive strip being coiled through at least about 360° along the length of said conductive strip.

2. The resistor of claim 1 wherein such conductive strip is a substantially planar conductive metal ribbon, said fluid conduit is of substantially constant interior dimensions along its length occupied by said ribbon and said ribbon and said conduit are coiled through at least 360° along the length of said strip in a plane perpendicular to the surfaces of said ribbon.

3. The resistor of claim 1 wherein said conductive strip has a substantially constant cross-sectional area along its length, a surface to volume ratio of at least about two, and a width at least about 90 percent of the maximum inside diameter of said fluid conduit, and said fluid conduit has substantially constant interior dimensions along the length of said conductive strip.

4. The resistor of claim 3 wherein said fluid conduit and said conductive strip are contained within a structurally rigid container having a coolant inlet and a coolant outlet in fluid communication with said coolant inlet and outlet respectively of said fluid conduit, and electric terminals in electrical communication with said terminals extending into said conduit and conductively connected with the two ends of said conductive strip.

5. The resistor of claim 4 further comprising a water conduit in fluid communication between said fluid inlet and a municipal water supply.

6. The resistor of claim 1 further comprising temperature sensing means in heat exchange relationship with the interior of said fluid conduit or said fluid outlet for detecting the temperature of cooling fluid within said conduit or fluid outlet and generating a signal responsive to said temperature, and circuit breaking means responsive to said signal for discontinuing the passage of current to said conductive strip when said temperature exceeds a predetermined maximum.

7. The resistor of claim 2 wherein the lengths of said flexible conduit and said ribbon are at least about 10 feet, said conduit has an inside diameter less than about 2 inches, said ribbon has a width to thickness ratio of at least about 10, and a surface to volume ratio of at least about 2.

8. The resistor of claim 2 wherein the lengths of said flexible conduit and said ribbon are at least about 15 feet, said conduit has an inside diameter less than about 2 inches, said ribbon has a width to thickness ratio of at least about 10, and a surface to volume ratio of at least about 2, and said axial passageways prescribed by said surfaces of said ribbon and said interior walls of said conduit are sufficient to enable the passage of water through said passageways and along the entire length of said conductive ribbon from a municipal water supply and under the existing pressure of said municipal water supply at a rate sufficient to dissipate the heat generated by electrical power applied to said conductive ribbon at a rate corresponding to at least about 10kw and maintain the temperature of said water within said fluid conduit and along the surfaces of said metal ribbon at a point below the temperature at which any water vapor is formed on said surfaces of said metal ribbon.

* * * * *